United States Patent
Kuo

(10) Patent No.: US 9,317,162 B2
(45) Date of Patent: Apr. 19, 2016

(54) APPARATUS AND METHOD FOR PROTECTING TOUCH PANEL DEVICE FROM NOISE INTERFERENCE

(75) Inventor: Chung-Jen Kuo, Hsin-Chu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 708 days.

(21) Appl. No.: 13/309,560

(22) Filed: Dec. 2, 2011

(65) Prior Publication Data

US 2012/0306803 A1  Dec. 6, 2012

Related U.S. Application Data

(60) Provisional application No. 61/492,806, filed on Jun. 2, 2011.

(51) Int. Cl.
- *G06F 3/044* (2006.01)
- *G06F 3/041* (2006.01)
- *G06F 1/16* (2006.01)
- *G06F 3/0354* (2013.01)

(52) U.S. Cl.
CPC .............. *G06F 3/044* (2013.01); *G06F 1/1643* (2013.01); *G06F 3/03547* (2013.01); *G06F 3/041* (2013.01); *G06F 3/0418* (2013.01)

(58) Field of Classification Search
CPC .............................. G06F 3/044; G06F 3/0488
USPC .................................................. 345/173, 174
See application file for complete search history.

(56) References Cited

U.S. PATENT DOCUMENTS

| | | | | |
|---|---|---|---|---|
| 5,859,392 | A * | 1/1999 | Petty | 178/18.01 |
| 8,896,566 | B2 | 11/2014 | Koh | |
| 2010/0103120 | A1* | 4/2010 | Fann et al. | 345/173 |
| 2010/0188362 | A1* | 7/2010 | Mahowald et al. | 345/174 |
| 2010/0278085 | A1* | 11/2010 | Hahn | 370/286 |
| 2012/0105353 | A1* | 5/2012 | Brosnan | 345/174 |

FOREIGN PATENT DOCUMENTS

CN  102043559 A  5/2011

* cited by examiner

*Primary Examiner* — Kent Chang
*Assistant Examiner* — Chayce Bibbee
(74) *Attorney, Agent, or Firm* — Winston Hsu; Scott Margo

(57) ABSTRACT

A protection circuit for a touch panel device includes a detection block and a protection block. The detection block is arranged for detecting occurrence of noise interference that affects touch event detection of the touch panel device, and asserting a protection signal when occurrence of the noise interference is detected. The protection block is arranged for enabling a protection mechanism for protecting the touch panel device from the noise interference when triggered by the asserted protection signal. Besides, a protection method for a touch panel device includes: detecting occurrence of noise interference that affects touch event detection of the touch panel device; and enabling a protection mechanism for protecting the touch panel device from the noise interference when occurrence of the noise interference is detected.

8 Claims, 12 Drawing Sheets

APPARATUS AND METHOD FOR PROTECTING TOUCH PANEL DEVICE FROM NOISE INTERFERENCE

CROSS REFERENCE TO RELATED APPLICATIONS

This application claims the benefit of U.S. provisional application No. 61/492,806, filed on Jun. 2, 2011 and incorporated herein by reference.

BACKGROUND

The disclosed embodiments of the present invention relate to a protection mechanism for a touch panel device, and more particularly, to a protection circuit for detecting occurrence of noise interference that affects touch event detection of a touch panel device and enabling a protection mechanism for protecting the touch panel device from the noise interference when occurrence of the noise interference is detected, and related protection method and electronic device thereof.

Touch panel devices are now widely used in a variety of applications to act as user interfaces. In general, a touch panel device may include a touch panel and a touch controller. Regarding certain applications, capacitive touch panels (e.g., mutual-capacitance touch panels or self-capacitance touch panels) may be used. Thus, the touch controller generates a driving signal to the capacitive touch panel, receives a sensing output generated from the capacitive touch panel, and generates a touch event detection result (e.g., coordinate and/or action information of the detected touch event) according to the received sensing output.

However, under certain conditions, the touch panel device may not work as expected. For example, when there is undesired noise interference, the touch event detection of the touch panel device may produce an erroneous output. For example, considering a case where the touch panel device is disposed in a mobile phone, the radio-frequency (RF) signals generated from and received by the mobile phone may also be coupled to the touch panel. When there is an RF signal with large amplitude, the noise interference introduced by such an RF signal would result in signal saturation. Consequently, the touch controller generates an erroneous touch event detection output due to the RF signal with large amplitude. Besides, when the user uses a low-cost/low-quality charger to charge a battery device of the mobile phone, the low-cost/low-quality charger may introduce high common-mode noise in the power supplied to the touch panel device, thus making the touch controller operate abnormally.

Thus, there is a need for a protection mechanism which is capable of protecting the touch panel device from undesired noise interference to thereby improve accuracy of the touch event detection.

SUMMARY

In accordance with exemplary embodiments of the present invention, a protection circuit for detecting occurrence of noise interference that affects touch event detection of a touch panel device and enabling a protection mechanism for protecting the touch panel device from the noise interference when occurrence of the noise interference is detected, and related protection method and electronic device are proposed, to solve the above-mentioned problem.

According to a first aspect of the present invention, an exemplary protection circuit for a touch panel device is disclosed. The exemplary protection circuit includes a detection block and a protection block. The detection block is arranged for detecting occurrence of noise interference that affects touch event detection of the touch panel device, and asserting a protection signal when occurrence of the noise interference is detected. The protection block is arranged for enabling a protection mechanism for protecting the touch panel device from the noise interference when triggered by the asserted protection signal.

According to a second aspect of the present invention, an exemplary protection method for a touch panel device is disclosed. The exemplary protection method includes: detecting occurrence of noise interference that affects touch event detection of the touch panel device; and enabling a protection mechanism for protecting the touch panel device from the noise interference when occurrence of the noise interference is detected.

According to a third aspect of the present invention, an exemplary electronic device is disclosed. The exemplary electronic device includes a host, a touch panel device, and a protection circuit. The touch panel device is arranged to detect a touch event and generating a touch event detection result to the host. The protection circuit includes a detection block and a protection block. The detection block is arranged for detecting occurrence of noise interference that affects touch event detection of the touch panel device, and asserting a protection signal when occurrence of the noise interference is detected. The protection block is arranged for enabling a protection mechanism for protecting the touch panel device from the noise interference when triggered by the asserted protection signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
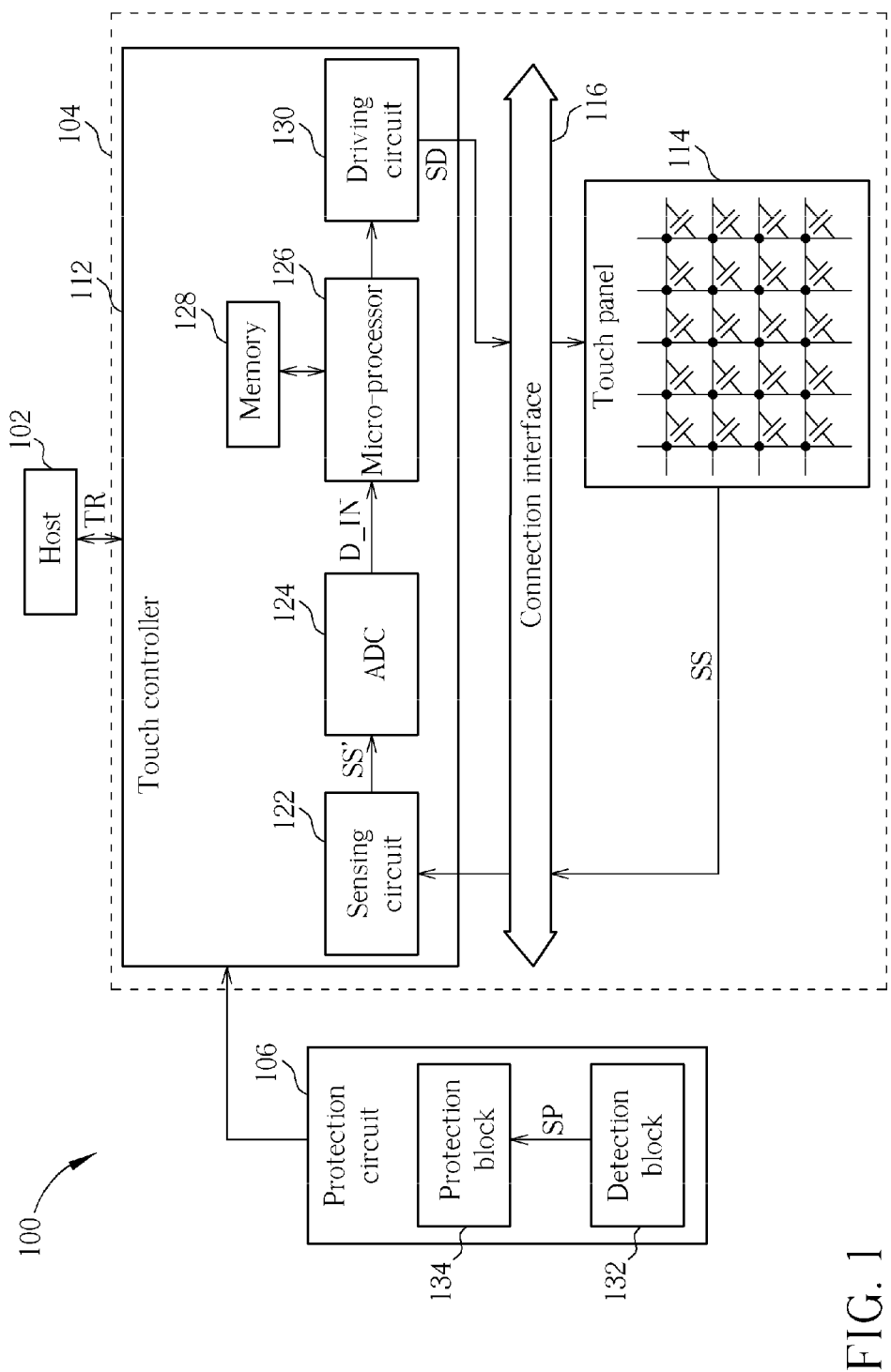
FIG. 1 is a block diagram illustrating an electronic device having a protection circuit included therein according to an exemplary embodiment of the present invention.

FIG. 1 is a block diagram illustrating an electronic device having a protection circuit included therein according to an exemplary embodiment of the present invention. By way of example, the electronic device 100 may be a phone apparatus such as a smart phone. However, this is not meant to be a limitation of the present invention. In practice, any application using the proposed protection circuit should fall within the scope of the present invention. As shown in FIG. 1, the electronic device 100 includes, but is not limited to, a host 102, a touch panel device 104, and a protection circuit 106. The touch panel device 104 includes a touch controller 112 and a touch panel 114, where the touch controller 112 has a sensing circuit (i.e., a touch panel sensing circuit) 122, an analog-to-digital converter (ADC) 124, a micro-processor 126, a memory 128, and a driving circuit (i.e., a touch panel driving circuit) 130, and the touch panel 114 may be a capacitive touch panel (e.g., a mutual-capacitance touch panel). The host 102 controls the designated functionality of the electronic device 100. For example, the host 102 may include a central processing unit (CPU) which executes an operating system (OS) to provide services requested by the user. The touch controller 112 communicates with the touch panel 114 via a connection interface 116 such as an interconnection cable. The touch panel device 104 is arranged to detect a touch event (e.g., one or more fingers having contact with the touch panel 114) and generate a touch event detection result TR to the host 102. The micro-processor 126 controls the driving circuit 130 to generate driving signals SD to the touch panel 114 via the connection interface 116. After the touch panel 114 is driven by the driving signals SD, a sensing output SS of the touch panel 114 is read by the sensing circuit 112 via the connection interface 116, and then the sensing circuit 112 processes its signal input (i.e., the sensing output SS) and accordingly generates a signal output SS' to the ADC 124. Next, the ADC 124 converts the analog signal output SS' into a digital input D_IN. The micro-processor 126 uses the memory 128 to buffer the digital input D_IN to be processed and processed data generated from processing the digital input DIN, and generates the touch event detection result TR to the host 102. When a touch event (e.g., one or more finger(s) having contact with the touch panel 114) is detected by processing the digital input D_IN, the touch event detection result TR may include coordinate and/or action information of the detected touch event. Therefore, based on the coordinate and/or action information of the detected touch event, the host 102 may perform a specific operation accordingly. As a person skilled in the art should readily understand operation of the touch panel device 104, further description is therefore omitted here for brevity.

Regarding the protection circuit 106, it includes, but is not limited to, a detection block 132 and a protection block 134. The detection block 132 is arranged for detecting occurrence of noise interference that affects touch event detection of the touch panel device 104, and asserting a protection signal SP (e.g., making the protection signal SP have a high logic level) when occurrence of the noise interference is detected. The protection block 134 is arranged for enabling a protection mechanism for protecting the touch panel device 104 from the noise interference when triggered by the asserted protection signal SP. In FIG. 1, the protection circuit 106 is shown as a standalone circuit block. However, this is for illustrative purposes only, and is not meant to be a limitation of the present invention. For example, one or both of the protection block 134 and the detection block 132 may be integrated within the touch panel device 104, depending upon actual design consideration/requirement. Further details of the protection circuit 106 are described hereinafter.

Figure 2:
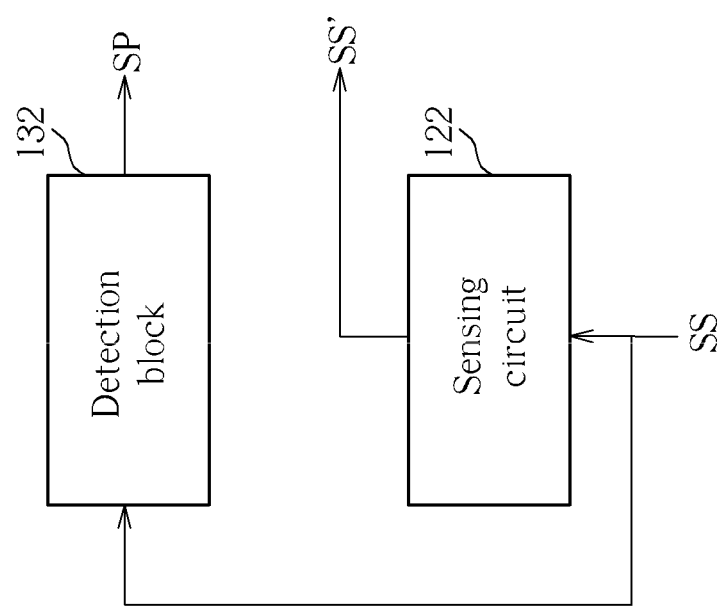
FIG. 2 is a diagram illustrating a first exemplary implementation of the detection block shown in FIG. 1.

Please refer to FIG. 2, which is a diagram illustrating a first exemplary implementation of the detection block 132 shown in FIG. 1. In this exemplary implementation, the detection block 132 detects occurrence of the noise interference by monitoring a signal input (i.e., the sensing output SS of the touch panel 114) fed into the sensing circuit 122. For example, the detection block 132 may check the signal characteristic of the sensing output SS to determine if the touch panel device 104 is under the threat of the noise interference (e.g., an RF signal with large amplitude and/or high common-mode noise present in the supplied power).

Figure 3:
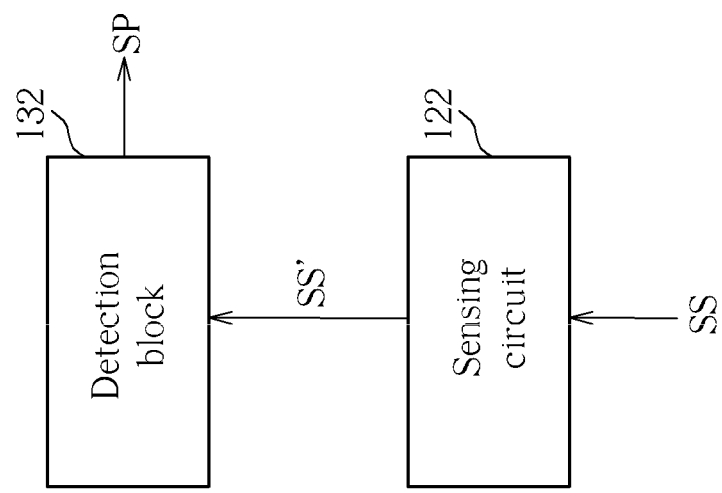
FIG. 3 is a diagram illustrating a second exemplary implementation of the detection block shown in FIG. 1.

Please refer to FIG. 3, which is a diagram illustrating a second exemplary implementation of the detection block 132 shown in FIG. 1. In this exemplary implementation, the detection block 132 detects occurrence of the noise interference by monitoring a signal output SS' generated from the sensing circuit 122. For example, the detection block 132 may check the signal characteristic of the signal output SS' to determine if the touch panel device 104 is under the threat of the noise interference (e.g., an RF signal with large amplitude and/or high common-mode noise present in the supplied power). It should be noted that the signal output SS' may be a conventional signal which is a filtered, integrated or demodulated signal.

Figure 4:
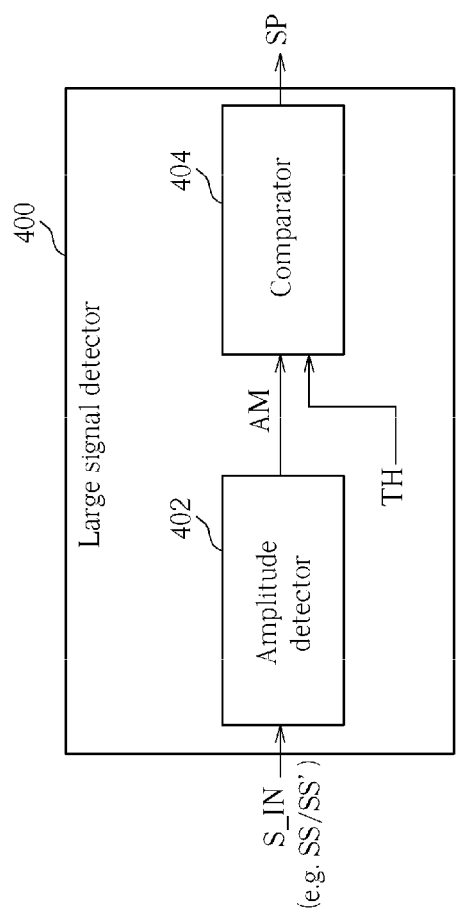
FIG. 4 is a diagram illustrating a large signal detector according to an exemplary embodiment of the present invention.

The aforementioned detection block 132 may be realized by a configuration for large signal detection. Please refer to FIG. 4, which is a diagram illustrating a large signal detector according to an exemplary embodiment of the present invention. The large signal detector 400 may be employed to implement the detection block 132 shown in FIG. 1, FIG. 2 or FIG. 3. In this exemplary embodiment, the large signal detector 400 includes an amplitude detector 402 and a comparator 404. The amplitude detector 402 is arranged for detecting amplitude AM of a specific signal S_IN, wherein the specific signal S_IN is derived from a sensing output of a touch panel. For example, the specific signal S_IN may be the sensing output SS directly or the signal output SS' derived from processing the sensing output SS. The comparator 404 is arranged for comparing the amplitude AM of the specific signal S_IN with a predetermined threshold TH, and asserting the protection signal SP when the amplitude AM of the specific signal S_IN exceeds the predetermined threshold TH (i.e., AM>TH). When a noise source is present and the introduced noise interference is coupled to the touch panel 114, the noise component included in the specific signal S_IN (e.g., the sensing output SS or the signal output SS') would make the signal amplitude higher than a normal level. Based on such an observation, the large signal detector 400 is thus devised to monitor the amplitude AM of the specific signal S_IN to detect occurrence of the noise interference. When the protection signal SP is asserted by the comparator 404, the protection block 134 would enable a protection mechanism to protect the touch panel device 104 from noise interference.

Figure 5:
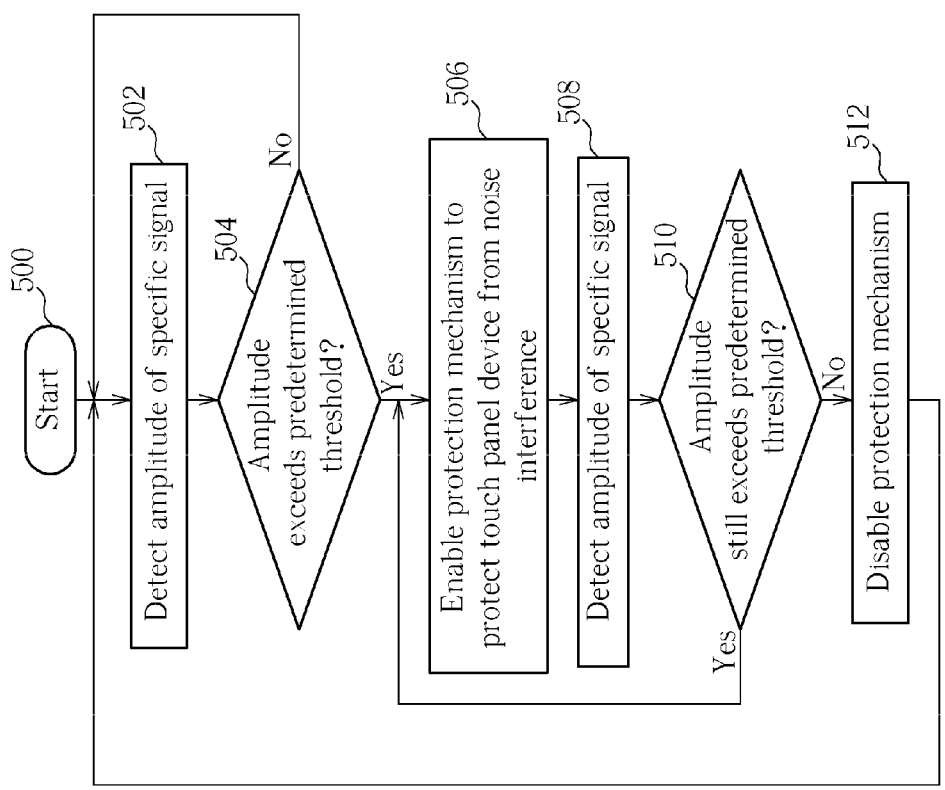
FIG. 5 is a flowchart illustrating a protection method for protecting a touch panel device from noise interference according to an exemplary embodiment of the present invention.

FIG. 5 is a flowchart illustrating a protection method for protecting a touch panel device from noise interference according to an exemplary embodiment of the present invention. The protection method may be employed by the electronic device 100 having the detection block 132 implemented by the large signal detector 400. The protection method may be briefly summarized as follows.

Step 500: Start.

Step 502: Detect amplitude of a specific signal, where the specific signal may be the sensing output SS generated from the touch panel 114 or the signal output SS' derived from processing the sensing output SS.

Step 504: Check if the amplitude of the specific signal exceeds a predetermined threshold. If yes, go to step 506; otherwise, proceed with step 502 to keep monitoring the occurrence of noise interference.

Step 506: Enable a protection mechanism to protect a touch panel device from noise interference.

Step 508: Detect amplitude of the specific signal.

Step 510: Check if the amplitude of the specific signal still exceeds the predetermined threshold. If yes, go to step 506 to keep enabling the protection mechanism; otherwise, proceed with step 512.

Step 512: Disable the protection mechanism. Go to step 502 to keep monitoring the occurrence of noise interference.

Steps 502 and 508 may be performed by the amplitude detector 402. Steps 504 and 510 may be performed by the comparator 404. Steps 506 and 512 may be performed by the protection block 134. When the amplitude of the specific signal is found larger than the predetermined threshold, implying that there may be noise interference affecting the touch event detection of the touch panel device 104, the protection signal SP is therefore asserted to enable the protection mechanism. When the amplitude of the specific signal does not exceed the predetermined threshold, implying that the current noise interference is negligible or there may be no noise interference, the protection signal SP is deasserted to make the protection mechanism disabled. With the help of the protection mechanism, the accuracy of the touch event detection is improved greatly.

Figure 6:
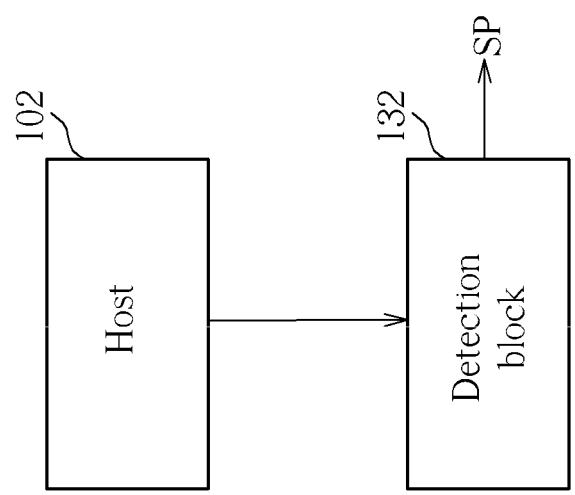
FIG. 6 is a diagram illustrating a third exemplary implementation of the detection block shown in FIG. 1.

In above exemplary embodiments, the detection block 132 may monitor a specific signal derived from a sensing output of a touch panel to check the occurrence of noise interference. When the touch panel device 104 is disposed in a phone apparatus (e.g., a smart phone), an alternative design of the detection block 132 may use the communication status of the phone apparatus to act as an indicator of occurrence of the noise interference. Please refer to FIG. 6, which is a diagram illustrating a third exemplary implementation of the detection block 132 shown in FIG. 1. The host 102 includes circuitry associated with the communication functionality. When the user of the phone apparatus wants to call someone, the phone apparatus would operate at maximum wireless communication power after sending an outgoing call request. Besides, when someone wants to call the user of the phone apparatus, an incoming call request is transmitted to the phone apparatus. The phone apparatus would operate at maximum wireless communication power after receiving the incoming call request. As the RF signal that is transmitted from the phone apparatus or received by the phone apparatus would have large amplitude when the phone apparatus operates at maximum wireless communication power, the detection block 132 may detect occurrence of the noise interference by monitoring reception of an incoming call request or transmission of an outgoing call request of the phone apparatus.

It should be noted that any means capable of avoiding or mitigating the touch event detection degradation caused by the undesired noise interference may be employed to implement the aforementioned protection mechanism provided by the protection block 134. In the following, several exemplary designs of the protection mechanism are provided for illustrative purposes.

Figure 7:
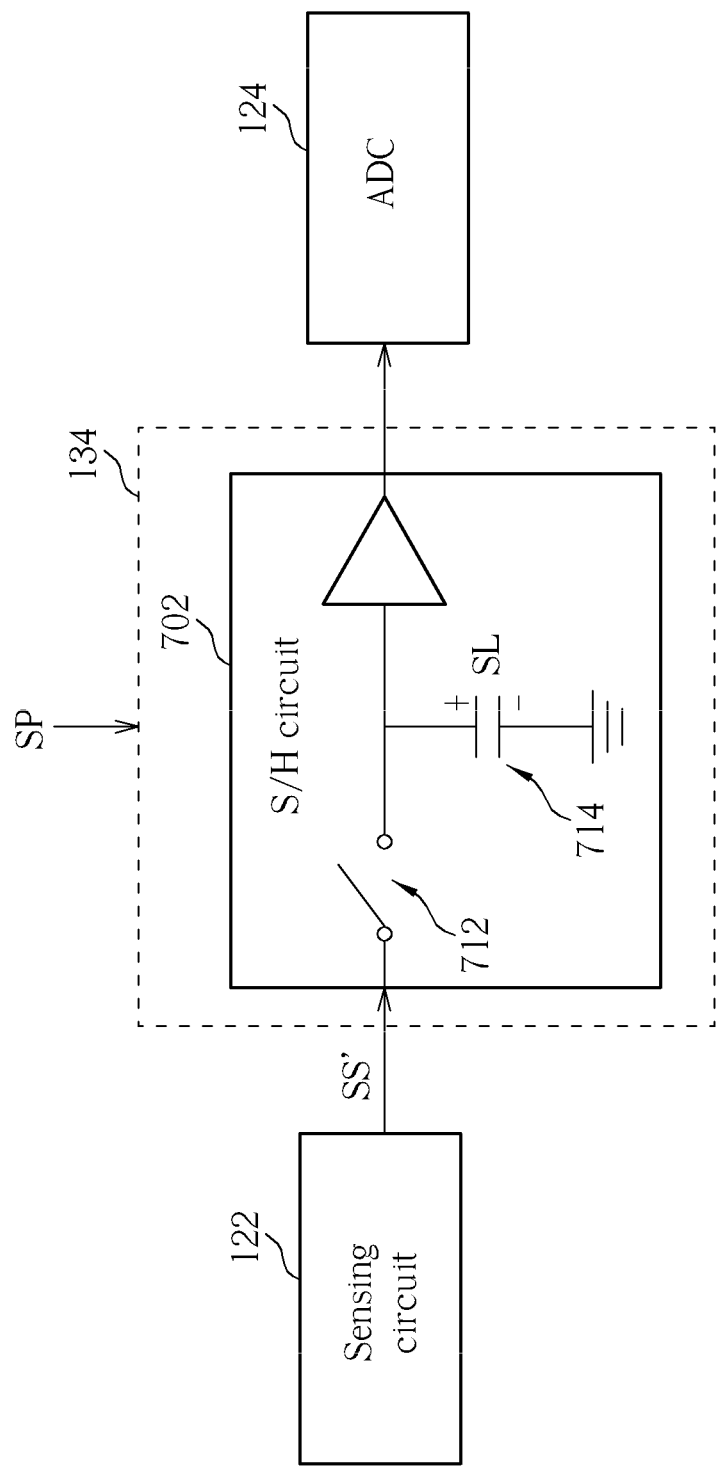
FIG. 7 is a diagram illustrating a first exemplary implementation of the protection block shown in FIG. 1.

Please refer to FIG. 7, which is a diagram illustrating a first exemplary implementation of the protection block 134 shown in FIG. 1. The protection block 134 includes a sample and hold (S/H) circuit 702. Therefore, when the protection block 134 is triggered by the asserted protection signal SP which indicates presence of the noise interference that would affect the touch event detection, the protection block 134 enables the protection mechanism by making the S/H circuit 702 hold a sampled signal level SL derived from sampling the signal output SS' generated from the sensing circuit 122. More specifically, when the asserted protection signal SP is received by the protection block 134, the instant signal level SL of the signal output SS' is stored into the capacitor 714 by the switch 712 which is switched on, and then the switch 712 is switched off such that the sampled signal level SL is held by the capacitor 714 and supplied to the following stage (i.e., ADC 124) for further signal processing. Therefore, as the switch 712 is switched off when there is noise interference, the sampled signal level SL is not affected by the noise interference. In this way, the noise component included in the signal output SS' would not result in signal saturation of the ADC 124, thereby preventing the micro-processor 126 from generating an erroneous touch even detection output. When the protection signal SP is deasserted due to negligible noise interference or no noise interference, the protection block 134 would bypass the signal output SS' to the ADC 124.

Figure 8:
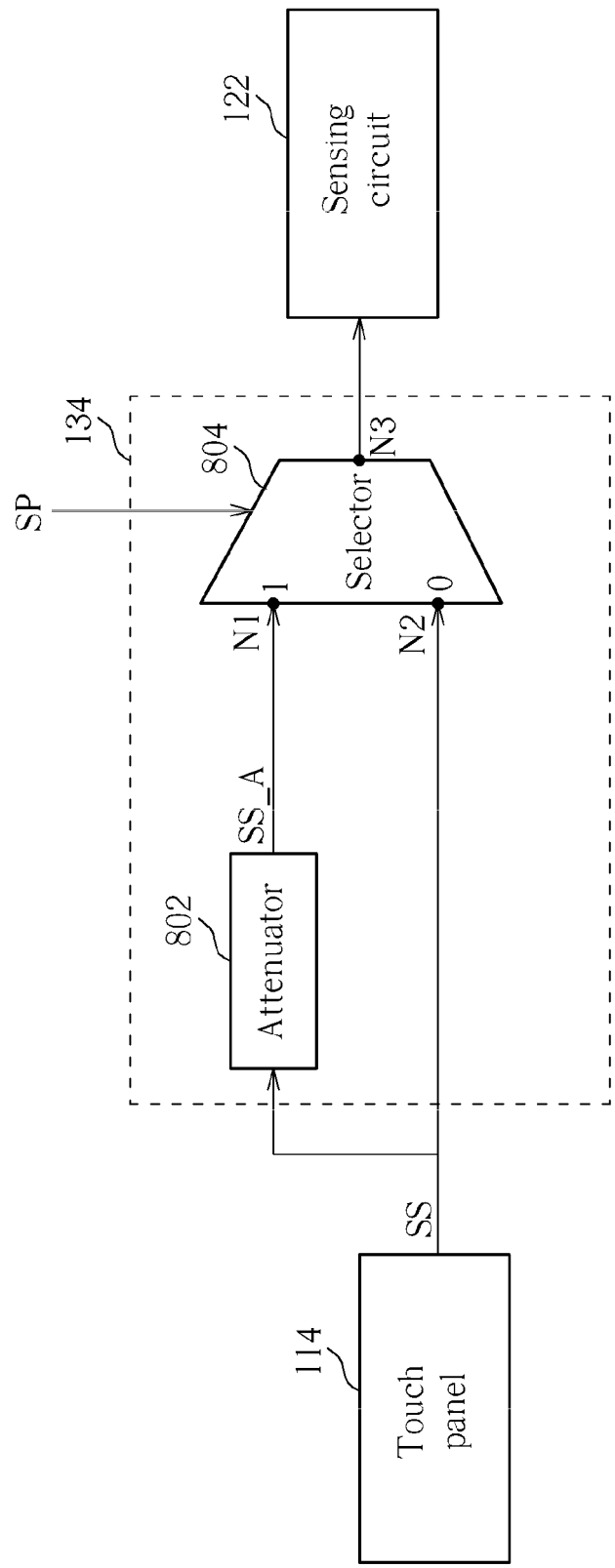
FIG. 8 is a diagram illustrating a second exemplary implementation of the protection block shown in FIG. 1.

Please refer to FIG. 8, which is a diagram illustrating a second exemplary implementation of the protection block 134 shown in FIG. 1. The protection block 134 includes an attenuator 802 and a selector 804. The attenuator 802 is arranged for attenuating the sensing output SS of the touch panel 114, and accordingly generating an attenuated sensing output SS_A. The selector 804 has a first input port N1 arranged to receive the attenuated sensing output SS_A, a second input port N2 arranged to receive the non-attenuated sensing output SS, and an output port N3. When the protection block 134 is triggered by the asserted protection signal SP which indicates presence of the noise interference that would affect the touch event detection, the protection block 134 enables the protection mechanism by making the output port N3 of the selector 804 output the attenuated sensing output SS_A to the sensing circuit 122. More specifically, in this exemplary implementation, when the protection signal SP is asserted to have a logic high level "1", the selector 804 couples the output port N3 to the first input port N1 for selecting the attenuated sensing output SS_A as its output, and when the protection signal SP is deasserted to have a logic low level "0", the selector 804 couples the output port N3 to the second input port N2 for selecting the non-attenuated sensing output SS as its output. Therefore, when occurrence of the noise interference is detected by the detection block 132, the sensing circuit 122 would receive the attenuated sensing output SS_A instead of the non-attenuated sensing output SS. As the amplitude of the noise component as well as the amplitude of the desired signal component is reduced, the signal saturation mainly caused by the noise component is avoided, thereby allowing the micro-processor 126 to have the chance of correctly detecting the touch event and generating a correct touch event detection result.

Figure 9:
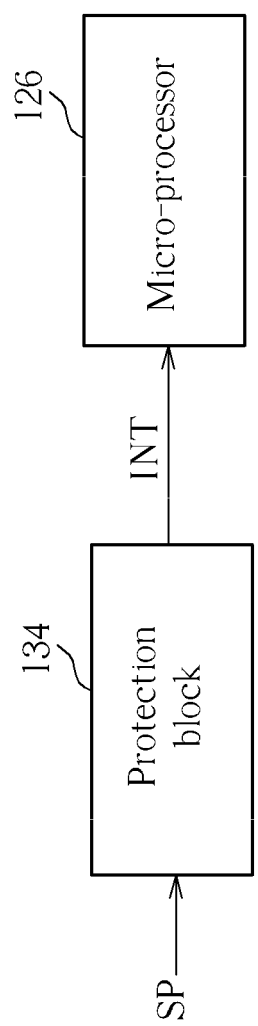
FIG. 9 is a diagram illustrating a third exemplary implementation of the protection block shown in FIG. 1.

Please refer to FIG. 9, which is a diagram illustrating a third exemplary implementation of the protection block 134 shown in FIG. 1. In this exemplary implementation, the protection block 134 is coupled to the micro-processor 126. When the protection block 134 is triggered by the asserted protection signal SP, the protection block 134 enables the protection mechanism by issuing an interrupt INT to the micro-processor 126 for blocking the micro-processor 126 from outputting the touch event detection result TR to the host 102. As the micro-processor 126 may generate an erroneous touch event detection result when there is large noise interference, the protection block 134 therefore stops the micro-processor 126 from reporting the touch event detection result TR when receiving the protection signal SP that is asserted. In this way, during the presence of the noise interference that would affect the touch event detection, the host 102 is protected from performing operations in response to the erroneous touch event detection result.

Figure 10:
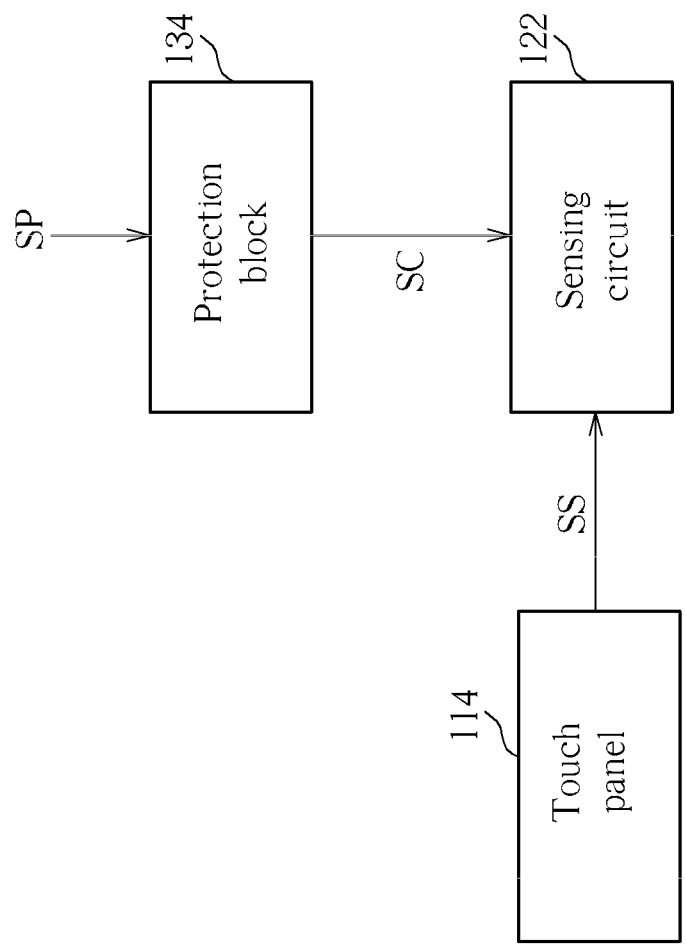
FIG. 10 is a diagram illustrating a fourth exemplary implementation of the protection block shown in FIG. 1.

Please refer to FIG. 10, which is a diagram illustrating a fourth exemplary implementation of the protection block 134 shown in FIG. 1. In this exemplary implementation, the protection block 134 is coupled to the sensing circuit 122. When the protection block 134 is triggered by the asserted protection signal SP, the protection block 134 enables the protection mechanism by generating a control signal SC to the sensing circuit 122 for stopping the sensing circuit 122 from receiving the sensing output SS of the touch panel 114. In other words, during the presence of the noise interference that would affect the touch event detection, the sensing output SS having the noise component with large amplitude is not received by the sensing circuit 122, thus preventing the micro-processor 126 from generating an erroneous touch event detection result.

Figure 11:
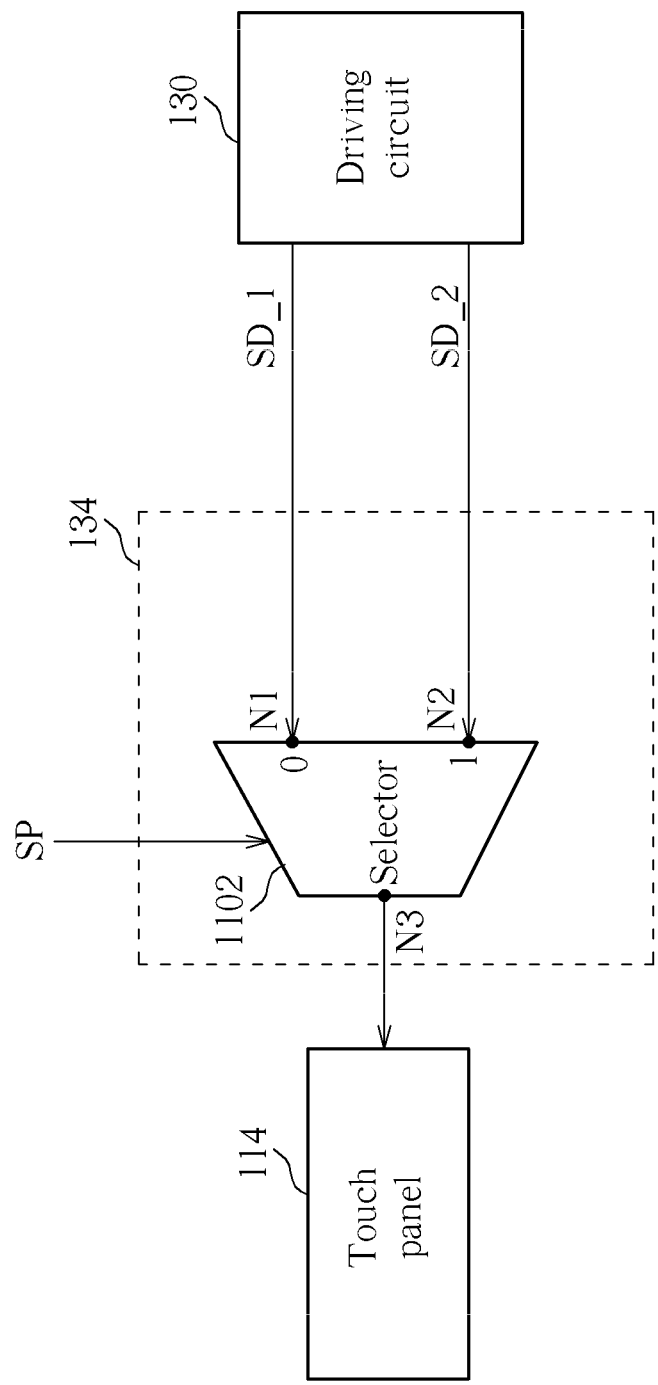
FIG. 11 is a diagram illustrating a fifth exemplary implementation of the protection block shown in FIG. 1.

Please refer to FIG. 11, which is a diagram illustrating a fifth exemplary implementation of the protection block 134 shown in FIG. 1. In this exemplary implementation, the protection block 134 is coupled between the touch panel 114 and the driving circuit 130. The protection block 134 includes a selector 1102 having a first input port N1, a second input port N2, and an output port N3. As shown in FIG. 11, the first input port N1 is arranged for receiving a first driving signal SD_1 generated from the driving circuit 130, the second input port N2 is arranged for receiving a second driving signal SD_2 generated from the driving circuit 130. When the protection block 134 is triggered by the asserted protection signal SP, the protection block 134 enables the protection mechanism by making the output port N3 of the selector 1102 output the second driving signal SD_2. More specifically, when the protection signal SP is asserted to have a logic high level "1", the selector 1102 couples the output port N3 to the second input port N2 for selecting the second driving signal SD_2 as its output, and when the protection signal SP is deasserted to have a logic low level "0", the selector 1102 couples the output port N3 to the first input port N1 for selecting the first driving signal SDI as its output. Please note that the touch panel 114 that receives the selected second driving signal SD_2 is more resistive to the noise interference than the touch panel 114 that receives the selected first driving signal SD_1. In one exemplary design, amplitude of the second driving signal SD_2 is greater than amplitude of the first driving signal SD_1. Therefore, the sensing output SS of the touch panel 114 would have the desired signal component with increased amplitude due to the second driving signal SD_2 supplied to the touch panel 114. The amplitude of the noise component included in the sensing output SS would be comparatively smaller when compared with the increased amplitude of the desired signal component. In this way, the micro-processor 126 may have the chance of correctly detecting the touch event and generating a correct touch event detection result.

In another exemplary design, a frequency of the second driving signal SD_2 is deviated from a frequency band of the noise interference. Therefore, when the second driving signal SD_2 is selected and supplied to the touch panel 114, the frequency of the desired signal component included in the sensing output SS is beyond the frequency band of the noise interference. In this way, as touch information carried by the desired signal component is not distorted/affected by the noise component, the micro-processor 126 is capable of correctly detecting the touch event and generating a correct touch event detection result.

Figure 12:
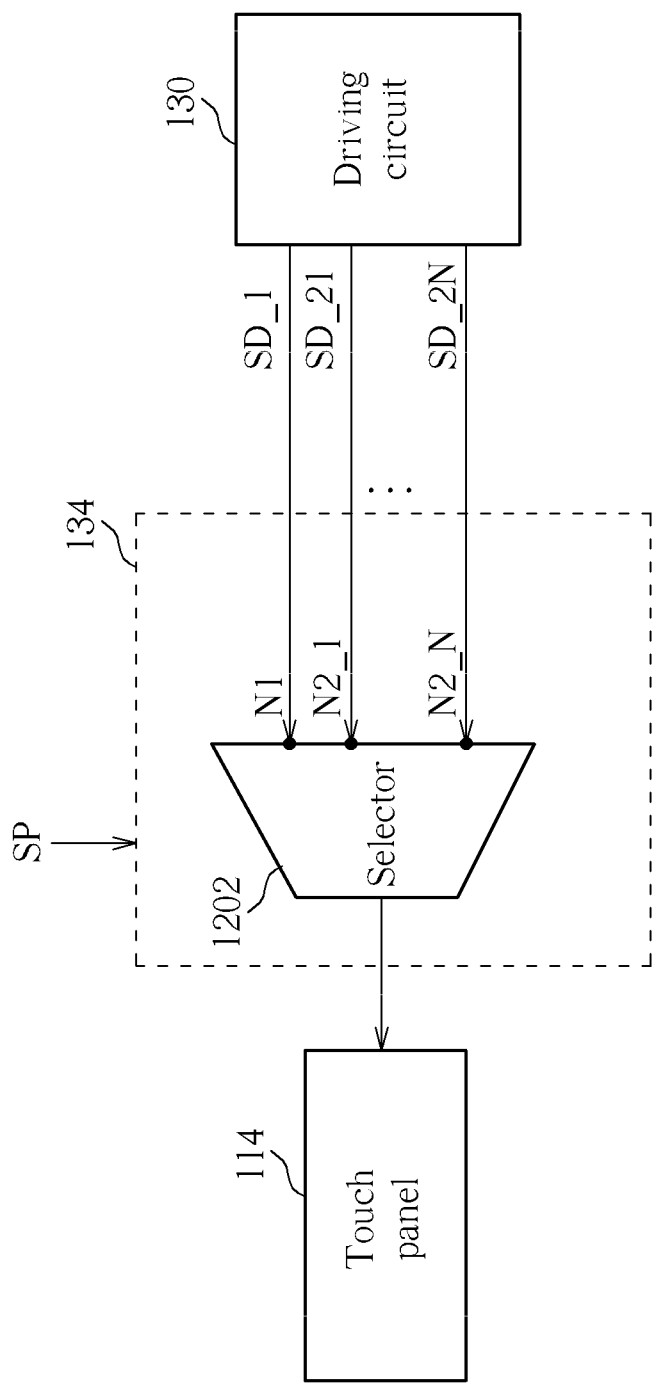
FIG. 12 is a diagram illustrating a sixth exemplary implementation of the protection block shown in FIG. 1.

As mentioned above, the touch panel 114 that receives the selected second driving signal SD_2 is more resistive to the noise interference than the touch panel 114 that receives the selected first driving signal SD_1. Therefore, the second driving signal SD_2 is selected as an output of the selector 1102 when the protection signal SP is asserted to indicate the presence of the noise interference that would affect the touch event detection. However, the number of second driving signals available for selection may be adjusted, depending upon actual design consideration/requirement. Please refer to FIG. 12, which is a diagram illustrating a sixth exemplary implementation of the protection block 134 shown in FIG. 1. The major difference between the exemplary implementations shown in FIG. 11 and FIG. 12 is that the selector 1202 has a plurality of second input ports N2_1-N2_N arranged for receiving a plurality of second driving signals SD_21-SD_2N, respectively. Each of the second driving signals SD_21-SD_2N is capable of making the touch panel 114 more resistive to the noise interference. For example, one of the second driving signals SD_21-SD_2N has amplitude greater than that of the first driving signal SD_1, and another of the second driving signals SD_21-SD_2N has a frequency deviated from a frequency band of the noise interference. By way of example, the protection block 134 may refer to a pre-defined rule or a user-specified command for determining which one of the second driving signals SD_21-SD_2N should be outputted as the selected second driving signal when the protection signal SP is asserted. The same objective of enabling a protection mechanism to protect the touch panel device 104 from noise interference upon reception of the asserted protection signal is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A protection circuit for a touch panel device, comprising:
  a detection block, arranged for detecting occurrence of noise interference that affects touch event detection of the touch panel device, and asserting a protection signal when occurrence of the noise interference is detected; and
  a protection block, arranged for enabling a protection mechanism for protecting the touch panel device from the noise interference when triggered by the asserted protection signal;

wherein the protection block comprises:
- an attenuator, arranged for attenuating a sensing output of a touch panel included in the touch panel device, and accordingly generating an attenuated sensing output; and
- a selector, having a first input port arranged to receive the attenuated sensing output, a second input port arranged to receive the sensing output, and an output port, wherein when the protection block is triggered by the asserted protection signal, the protection block enables the protection mechanism by making the output port of the selector output the attenuated sensing output.

2. A protection circuit for a touch panel device, comprising:
- a detection block, arranged for detecting occurrence of noise interference that affects touch event detection of the touch panel device, and asserting a protection signal when occurrence of the noise interference is detected; and
- a protection block, arranged for enabling a protection mechanism for protecting the touch panel device from the noise interference when triggered by the asserted protection signal;

wherein the protection block comprises:
- a selector, having a first input port, at least one second input port, and an output port coupled to a touch panel of the touch panel device, wherein the first input port is arranged for receiving a first driving signal generated from a touch panel driving circuit included in a touch controller of the touch panel device, the at least one second input port is arranged for receiving at least one second driving signal generated from the touch panel driving circuit, and when the protection block is triggered by the asserted protection signal, the protection block enables the protection mechanism by making the output port of the selector output a selected second driving signal, where the touch panel that receives the selected second driving signal is more resistive to the noise interference than the touch panel that receives the first driving signal.

3. The protection circuit of claim 2, wherein amplitude of the selected second driving signal is greater than amplitude of the first driving signal.

4. The protection circuit of claim 2, wherein a frequency of the selected second driving signal is deviated from a frequency band of the noise interference.

5. A protection method for a touch panel device, comprising:
- detecting occurrence of noise interference that affects touch event detection of the touch panel device;
- enabling a protection mechanism for protecting the touch panel device from the noise interference when occurrence of the noise interference is detected;
- attenuating a sensing output of a touch panel included in the touch panel device, and accordingly generating an attenuated sensing output; and
- utilizing a selector to receive the attenuated sensing output and the sensing output;

wherein the step of enabling the protection mechanism comprises:
making the selector output the attenuated sensing output.

6. A protection method for a touch panel device, comprising:
- detecting occurrence of noise interference that affects touch event detection of the touch panel device;
- enabling a protection mechanism for protecting the touch panel device from the noise interference when occurrence of the noise interference is detected; and
- utilizing a selector to receive a first driving signal and at least one second driving signal generated from a touch panel driving circuit included in a touch controller of the touch panel device;

wherein the step of enabling the protection mechanism comprises:
- making the selector output a selected second driving signal to a touch panel of the touch panel device, where the touch panel that receives the selected second driving signal is more resistive to the noise interference than the touch panel that receives the first driving signal.

7. The protection method of claim 6, wherein amplitude of the selected second driving signal is greater than amplitude of the first driving signal.

8. The protection method of claim 6, wherein a frequency of the selected second driving signal is deviated from a frequency band of the noise interference.

* * * * *